Feb. 2, 1954

C. P. SPAULDING 2,667,786

CAPACITOR PRESSURE GAUGE

Filed Feb. 11, 1950

INVENTOR.
CARL P. SPAULDING
BY
James E. Christie

ATTORNEY

Feb. 2, 1954   C. P. SPAULDING   2,667,786
CAPACITOR PRESSURE GAUGE
Filed Feb. 11, 1950   2 Sheets-Sheet 2

INVENTOR.
CARL P. SPAULDING
BY
James B Christie
ATTORNEY

Patented Feb. 2, 1954

2,667,786

UNITED STATES PATENT OFFICE 2,667,786

CAPACITOR PRESSURE GAUGE

Carl P. Spaulding, Pasadena, Calif., assignor to Consolidated Engineering Corporation, Pasadena, Calif., a corporation of California Application February 11, 1950, Serial No. 143,620

17 Claims. (Cl. 73—398)

This invention relates to a capacitance gauge and more particularly to a micro-manometer adapted to measure very small pressure differentials with extreme accuracy.

In a high vacuum system as employed, for example, in mass spectrometry, the pressure in the evacuated system is measured in the gauge of the invention by comparing it with a reference pressure, which, for all practical purposes, constitutes a perfect vacuum. However, for measuring lesser degrees of vacuum, or super-atmospheric pressure, a reference pressure is used which is known or is constant to within $1 \times 10^{-4}$ mm. of Hg. The biggest field of application for the gauge is in high vacuum systems where pressure variations of the order of 500 microns or less are to be measured.

In one form, the gauge comprises two chambers separated from each other by a flexible diaphragm. One of the chambers is connected to the system, the pressure of which is to be measured, and the other chamber is connected to means for maintaining the pressure therein at a predetermined value. A conductive member is located in one of the chambers and spaced from the diaphragm, the conductive member and diaphragm forming a capacitor, the capacitance of which varies responsive to deflections of the diaphragm.

A gauge of this type is described generally in co-pending application, Serial No. 592,830, filed May 9, 1945 by John H. Strange and Henry M. Grubb, now U. S. Patent No. 2,567,253, granted on September 11, 1951, and to the extent described above, no invention is claimed. However, in the gauge described in the Strange et al. application, the conductive member, which, with the diaphragm, forms a capacitor, was described as a metal plate mounted to a support passing through a wall of the chamber. For the reasons hereinafter explained, such construction would not adapt itself to a gauge for measuring the extremely small pressure differentials considered herein.

To measure pressure differentials of the order of magnitude of $1 \times 10^{-2}$ cm. of Hg by detecting and measuring the variation in capacitance of a capacitor, one plate of which is formed by a flexible diaphragm, presents a number of problems which apparently were not considered in the prior art. There are several means whereby this change in capacitance can be sensed and measured. Some of these are listed in the order of their accuracy:

1. The pressure differential deflecting the diaphragm and causing the variation in capacitance can be balanced with an equal and opposite electrostatic pressure applied across the capacitor to restore the diaphragm to a centered or null position. In this method the balance may be achieved by manual adjustment of an electrical system or by a servo-mechanism, as hereinafter described.

2. The capacitor of the gauge is incorporated in an impedance bridge, the change in impedance being determined by the impedance that must be added to another leg of the bridge to balance the bridge. This method may be also accomplished by manual adjustment of the system or by servo-means, if desired.

3. By incorporating the capacitance of the gauge in an impedance bridge and connecting the output of the bridge to an amplifier, the voltage output resulting from the unbalance of the bridge due to variations in the capacitance of the gauge capacitor can be measured. Although this method is the least sensitive and accurate of the methods mentioned, it has the advantage of high frequency response and hence, is applicable in certain circumstances where methods 1 and 2 are limited because of their lower frequency response.

An electrical network adapted for use in carrying out any one of these sensing methods is described and illustrated in my copending application, Serial No. 143,619, filed February 11, 1950.

Regardless of which of the above methods are employed, the question of spacing between the diaphragm and conductive member is of paramount importance in a gauge adapted to function in the range of the present instrument. To measure differentials of, say, 500 microns or less, it is necessary that the diaphragm and conductive member be not over .005 inch apart and preferably about .001 inch apart. It is, therefore, immediately apparent that the gauge described in the Strange et al. application could not be adapted to operation in this very low range of pressure differential since it would be substantially impossible to mount a plate within approximately .001 of an inch of the diaphragm if they were independently supported. Where it is desired to apply an electrostatic restoring force so that pressure measurement will be made on a null basis, considerations of gradient and voltage limitations enter into the picture limiting the spacing of the diaphragm and conductive member irrespective of the considerations of the magnitude of capacitance change.

The relationship between electrostatic pressure and the voltage gradient is given by the following well known equation:

$$P = \frac{Ko}{2}\left(\frac{V}{d}\right)^2$$

where $P$=pressure in newtons/meter$^2$
$Ko = 1.85 \times 10^{-12}$ farads/meter
$V$=volts
$D$=spacing in meters Solving this equation and converting to cgs. units, it can be shown that for a pressure differential of 100 microns, the electrostatic gradient or $V/d$=17,300 volts/cm. Since field emission has been observed for gradients as low as 100,000 volts/cm., the maximum possible pressure that can be measured by the electrostatic balance method based on a limitation of voltage gradient is about 3,300 microns.

However, another limiting factor is present, this being the maximum voltage which can be used without breakdown of the gas in the gauge. It is obvious that the voltage applied across the condenser must be less than the breakdown voltage of the gas forming the dielectric if consistent and accurate results are to be obtained. I have found that this maximum voltage is approximately 100 volts. To achieve the maximum voltage gradient of 100,000 volts/cm. with a maximum applied voltage of 100 volts, it is necessary that the spacing between the diaphragm and the conductive plate be approximately .001 cms. or .00040 inch. This spacing would permit operation of the gauge at the maximum pressure differential of 3,330 microns set by field emission considerations.

As the spacing is increased, the maximum pressure that can be electrostatically balanced decreases as the square of the spacing. With .001" spacing, the maximum pressure is about 500 microns, and with .005" spacing, the maximum pressure is about 20 microns.

At the same time, as the spacing is increased, the ratio of the change in capacity to the total capacity of the gauge for a given pressure change decreases proportionately. The minimum detectable pressure change therefore increases proportionately with the spacing. It follows therefore that the range and accuracy of such a gauge decrease rapidly as the spacing is increased and I have found that for 0.1% accuracy .001" spacing is necessary, and with spacings greater than .005" such a gauge, i. e., one which is electrostatically balanced, is virtually useless.

The problem of constructing a gauge in which a flexible diaphragm divides the gauge into two chambers and a conductive member is placed at a distance of not more than .005 of an inch from the conductive diaphragm has been solved by resting a dielectric disk against the diaphragm and accurately forming a cavity of appreciable area in the adjoining face of the disk. A thin coating of gold is applied to a major part of the surface of the cavity to form a conductive member closely adjacent to but spaced from the diaphragm. By this means the spacing between the gold coating and the diaphragm is accurately achieved and is not subject to any variation regardless of the manner in which the gauge is handled. The cavity in the dielectric disk may be concave or as an alternative, an extremely shallow flat-bottomed hole may be formed therein and provided with a thin coating of gold, the object in either case being to achieve a fixed spacing between the gold surface and the diaphragm upon which the disk rests. However, a concave cavity has a number of advantages over a flat-bottomed hole. Apart from the fact that it is easier to accurately form a concave surface than a hole of comparable depth, the primary advantage lies in an increased sensitivity achieved with the concave face. Thus with a concavity of a maximum depth of, say, a .001 inch as compared to a flat-bottomed hole of the same depth, the average spacing between the gold coating on the concave surface and the diaphragm is approximately one-half the average spacing of a similar coating on the bottom of such a hole. This average smaller spacing is made possible on the concave surface by reason of the fact that the center portion of the diaphragm is at a maximum spacing from the gold plate. Since this is the portion of the diaphragm that is deflected to the greatest extent by the existence of a pressure differential across the diaphragm, it is at this point that the maximum spacing is required. Hence, the spacing that can be tolerated towards the edges of the diaphragm cannot be tolerated toward the middle of the diaphragm and a concave adjoining conducting surface is optimum for this reason.

The invention will be more clearly understood by reference to the accompanying drawing, in which.

Figure 1:
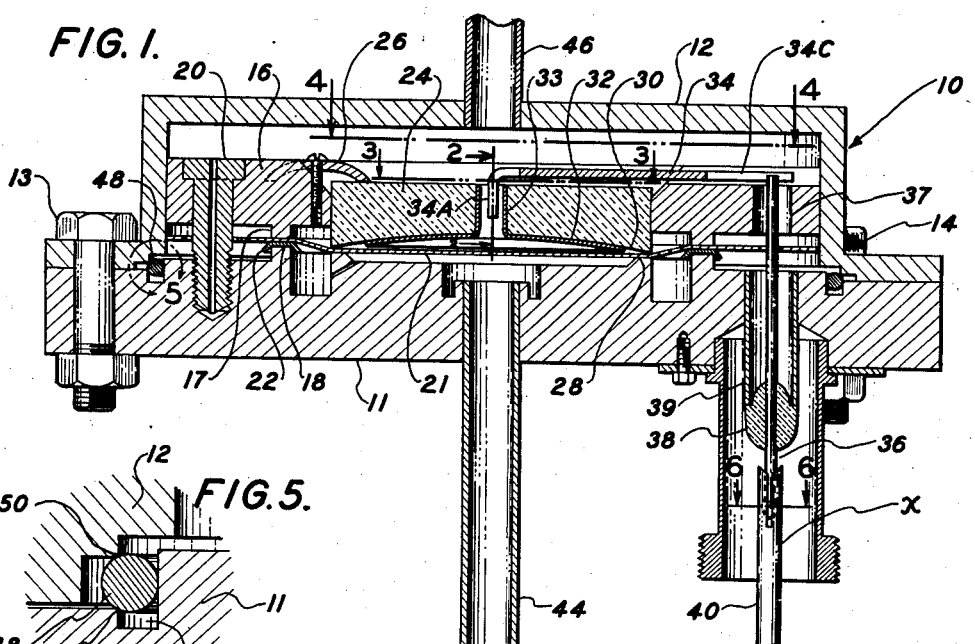
Fig. 1 is a sectional elevation of one form of the gauge of the invention.

Referring to Fig. 1, the embodiment there shown comprises a housing 10, including a base member 11 and a cover member 12 affixed to the base member 11 by bolts 13, 14, etc. A clamping ring 16 is enclosed by the cover member 12 and is provided with an annular projecting rib 17 vertically aligned with a like annular rib 18 formed on the member 11. The clamping ring 16 is held against the base member 11 with the ribs 17 and 18 in engagement by means of a series of bolts extending into the base member. One of these bolts 20 is visible in the figure. The bolt 20 has a small longitudinal bore therein to vent the unfilled portion of the bolt receiving hole in base 11, a precaution taken in view of the extreme sensitivity of the gauge.

A flexible stainless steel diaphragm 21 is stretched across the center portion of the base member 11 and is clamped in this stretched position between the ribs 17, 18 of the clamping ring 16 and the base member 11, respectively. An annular metal gasket 22, preferably gold, is interposed between the diaphragm and the rib 18.

Figure 2:
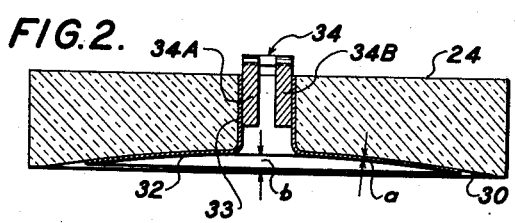
Fig. 2 is an enlarged sectional elevation of the dielectric disk used in the gauge of Fig. 1 and showing the gold coating on the concave surface thereof, and means for making electrical contact with the gold coating.
Figure 3:
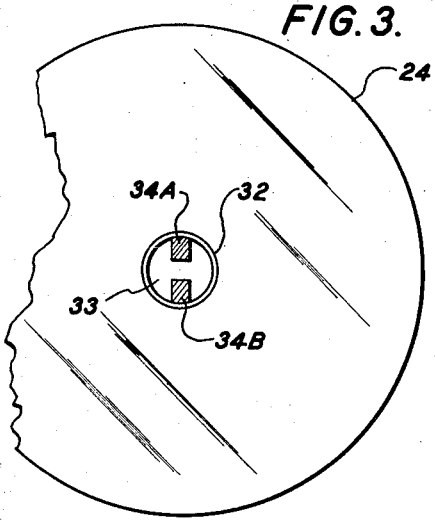
Fig. 3 is a section taken on the line 3—3 of Fig. 1.

A dielectric disk 24, preferably of glass, is retained in the annular clamping member 16 and is held against the diaphragm 21 by means of a series of spring clamps 26. The spring clamps 26 exert sufficient pressure on the disk 24 to distort the diaphragm 21, clamping it between the disk and an inner annular rib 28 on the base member 11 and stretching it taut across the face of the disk. The face 30 of the disk 24 adjacent the diaphragm is concave with respect to the diaphragm. A thin metal layer 32, preferably of gold, is formed on the concave face 30 and on the walls of a central bore 33 in the disk, all as shown more clearly in the enlarged sectional elevation of Fig. 2 taken on the line 2—2 of Fig. 1.

Figure 4:
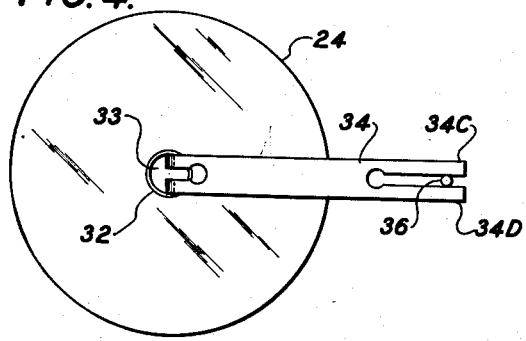
Fig. 4 is a section taken on the line 4—4 of Fig. 1.

A contact member 34 extends across the upper face of disk 24 and has split prongs 34A, 34B, projecting into the bore 33 and bearing against the metal layer 32 on the walls of the bore. The outer end of the contactor 34 is likewise split forming legs 34C, 34D (see Fig. 4). A tungsten lead 36 is sealed through the base member 11 extending through a peripheral bore 37 in the clamping ring 16 and engaging between the legs 34C, 34D of the contactor 34. The contactor 36 is sealed through a glass bushing 38 mounted on the end of the inlet tube 39 and is connected at its outer end with a connector 40.

Figure 6:
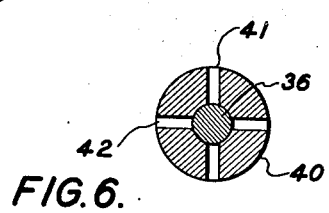
Fig. 6 is a section taken on the line 6—6 of Fig. 1.

The construction of contactor 40 is shown in Fig. 6, which is taken on the line 6—6 of Fig. 1. The contactor is a conductive rod having a longitudinal bore at one end to receive the lead 36 and radial longitudinal grooves 41, 42, etc. opening into the bore. The bore of the contactor is slightly smaller in diameter than the tungsten lead 36 so that good contact is insured through friction fit. The configuration of the glass disk and the electrical lead system for making contact with the metallic coating on the concave face and central bore of the disk is all detailed in Figs. 1, 2, 3, 4 and 6.

A conduit 44 is carried through the base member 11 and a second conduit 46 is carried through the cover member 12 for connecting the gauge on one side of the diaphragm to a reference pressure source and on the other side of the diaphragm to the system, the pressure of which is to be measured. The term "reference pressure source" is used in the specification and claims to include any source of known super-atmospheric pressure or any source of known sub-atmospheric pressure including an evacuating system capable of reducing the pressure to a degree of vacuum which for all practical purposes, may be assumed absolute.

If the gauge is to be used with an electrical circuit capable of developing an electrostatic restoring force between the metallic layer 32 and the diaphragm 21, it is essential that the system be connected so that the greatest pressure is on the side of the diaphragm adjacent the glass disk. This is true since an electrostatic restoring force is used to exert a pull to restore the diaphragm to a null position. However, if other means are used to detect deviations in the capacitance of the capacitor formed by the metallic coating 32 and the diaphragm 21, the greater pressure is preferably applied on the side of the diaphragm opposite the disk since deflection of the diaphragm 21 toward the disk will produce maximum relative capacitance change because such deflection will tend to conform the diaphragm to the configuration of the metallic coating and, in addition, will act to decrease rather than increase the average spacing between the diaphragm and metal layer.

It is, of course, essential that the gauge be absolutely leak proof. I have found that this can be accomplished by means of a gold ring gasket 48 disposed between the cover member 12 and the base member 11. The particular fashion in which the gold gasket 48 is secured between the cover and the base member is shown in the enlarged sectional elevation of Fig. 5 which is taken on the line 5—5 of Fig. 1. An annular groove 49 is formed in the base member 11 and is about half as deep as it is wide, forming an annular shoulder 49A. The gold gasket 48 is of a diameter in excess of the width of the annular groove 49 so that the gasket rests on the shoulder 49A. An annular shoulder 50 is formed on the cover member 12 and bears against the gasket 48 in alignment with the shoulder 49A. In this fashion, the gasket 48 is clamped between the two shoulders which, in effect, form two annular knife edges. The clamping force applied by the bolts 13, 14, etc. forces the annular shoulders 49A and 50 into the gasket 48 deforming it slightly and forming a perfect seal insuring a gauge that is absolutely leak proof. To provide a gauge suitable for use under conditions of continuously varying pressures, it is necessary to employ a metallic gasket. Fabric or resilient gasket materials are too porous to be satisfactory since variations in the pressure of the system under test will be obscured in part by so-called "breathing" of a gasket of this type. Although any relatively soft metal is satisfactory for this purpose, gold is presently preferred because of its high resistance to corrosion and chemical reaction, factors which must be considered in constructing a gauge for use in systems where many different types of gases may be encountered.

The same factors must be taken into account in selecting the metal to be used on the concave face of the glass disk. For the same reasons, gold is excellent for this purpose. The metal conducting surface may be applied to the glass disk in various ways. If gold is used, it is convenient to paint the desired surfaces of the disk with commercially available china paint and bake the disk to fuse with the gold carrier to the glass. A layer of gold applied in this manner is from about 0.00001" to about 0.000005" thick. As an alternative, a metallic coating may be applied by evaporating the metal onto the glass surfaces under vacuum. If this expedient is employed, it is well to paint the walls of the central bore which in general, are not adequately coated by the evaporation technique.

As material for the diaphragm, stainless steel of approximately 1 mil thickness is preferred. Stainless steel has the advantages of good corrosion resistance and high tensile strength. To mount the diaphragm in the gauge, it is stretched, as for example, in apparatus of the type shown in Fig. 8, and while thus stretched, it is clamped between the clamping ring and base. Thereafter it is trimmed to allow the cover member to be affixed to the base.

Figure 5:
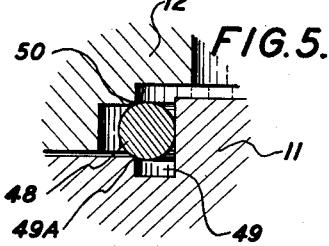
Fig. 5 is an enlarged view of the area defined by line 5—5 of Fig. 1.
Figure 7:
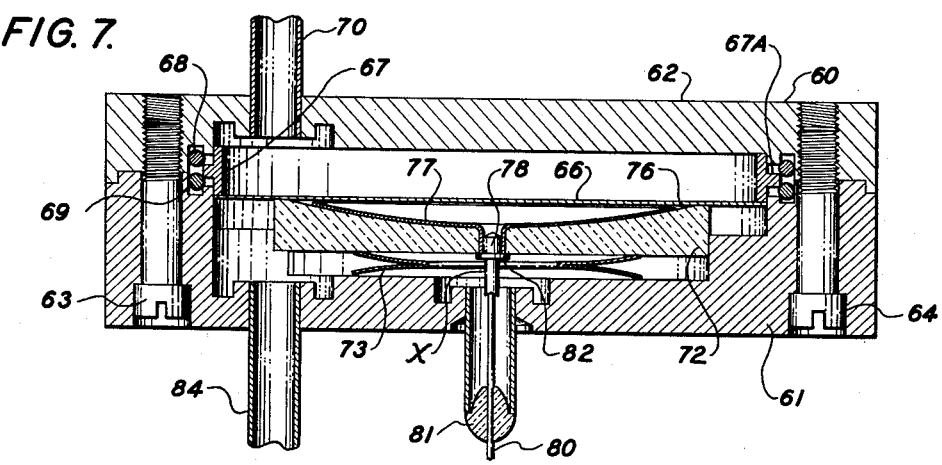
Fig. 7 is a sectional elevation of another form of the gauge of the invention.

A somewhat simpler embodiment of the invention is shown in sectional elevation in Fig. 7 and comprises a housing 60 formed by two members 61, 62 bolted together with bolts 63, 64, etc. In this embodiment a flexible diaphragm 66 is stretched and fastened across an annular strengthening ring 67. The ring 67 has a peripheral rib 67A engaging a pair of metal ring gaskets 68, 69 forming a seal between the members 62, 61, respectively, and the ring 67, all in the same manner as shown in Fig. 5. A conduit 70 opens through the housing member 62 into the space above the diaphragm 66. A dielectric disk 72, say of glass, is retained within the housing member 61 and is forced against the diaphragm 66 by a spring 73 interposed between the housing member 61 and the glass disk.

As in the foregoing embodiment, the glass disk 72 has a concave surface 76 adjoining the diaphragm 66 and the concave surface 76 is provided with a gold coating 77, which extends into a central bore 78. A lead 80 is carried through a glass seal 81 and is connected to the gold coating 77 in the central bore 78 by a contactor 82. A conduit 84 opens through the housing member 61 to the space beneath the diaphragm 66.

The operation of the gauge shown in Fig. 7 is the same as that of the gauge shown in Fig. 1, the differences lying in the manner of construction and not in the manner of operation.

Figure 8:
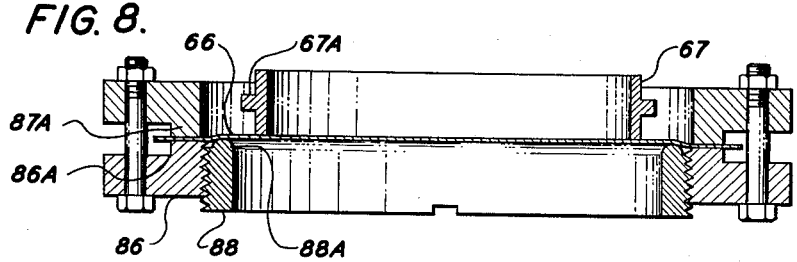
Fig. 8 is a sectional elevation of one form of apparatus for forming the diaphragm assembly in the apparatus of Fig. 7.

There is shown in sectional elevation, Fig. 8, one means for stretching the diaphragm 66 across the strengthening or retainer ring 67. This means comprises a pair of annular rings 86, 87 bolted together to hold the diaphragm 66 fairly tight between annular shoulders 86A, 87A. The ring 86 is threaded on its inner circumference to receive an externally threaded ring 88. The ring 88 is screwed into the ring 86 until the annular shoulder 88A of the ring 88 abuts against and distorts the diaphragm 66 thereby stretching it tightly across the inner ring 88. The strengthening ring 67 is then fastened to the diaphragm in any desired means. One convenient method of accomplishing this is to apply a solder coating to one edge of ring 67 and immerse the whole unit in a bath of low vapor pressure oil heated to the melting temperature of the solder. The bath is then allowed to cool until the ring 67 is firmly soldered to the diaphragm 66. Of course, the manner of affixing the diaphragm across the retaining ring 67 is immaterial to the operation of the gauge and any means for accomplishing the same are contemplated within the present invention.

As indicated above, the apparatus of Fig. 8 is also suitable for stretching the diaphragm to be used in the apparatus of Fig. 1. It is only necessary to construct the two retaining rings 86, 87 and the stretching ring 88 of larger diameter than the gauge housing. With the diaphragm stretched, as shown in Fig. 8, the whole assembly is laid across the base member 11 (Fig. 1) so that the center portion of the diaphragm rests on the gold gasket 22. Clamping ring 16 is then clamped into position to hold the diaphragm between annular ribs 17, 18. The stretching rings may then be removed without loss of tension in the portion of the diaphragm defined by ribs 17, 18. Of course, other means may be used for assembling the gauge to insure a taut, unwrinkled diaphragm.

Particular emphasis has been placed on the use of a glass disk having a concave face adjacent the diaphragm. Although this is preferred practice because of simplicity and accuracy of fabrication and because further, it permits of closer mean spacing, it is also within the contemplation of the invention to define the shape of the conductive surface in other ways. Thus a cylindrical depression .005 inch or less in depth may be ground or cut in the glass and the bottom thereof coated with a metallic layer to form the conductive surface. Other contours may also suggest themselves within the scope of the invention. The principle involved remains the same, to wit, contact of the glass disk with the diaphragm at the periphery of the disk permits spacing of a conductive surface adjacent the diaphragm to a tolerance not practical if the two were independently supported.

Figure 9:
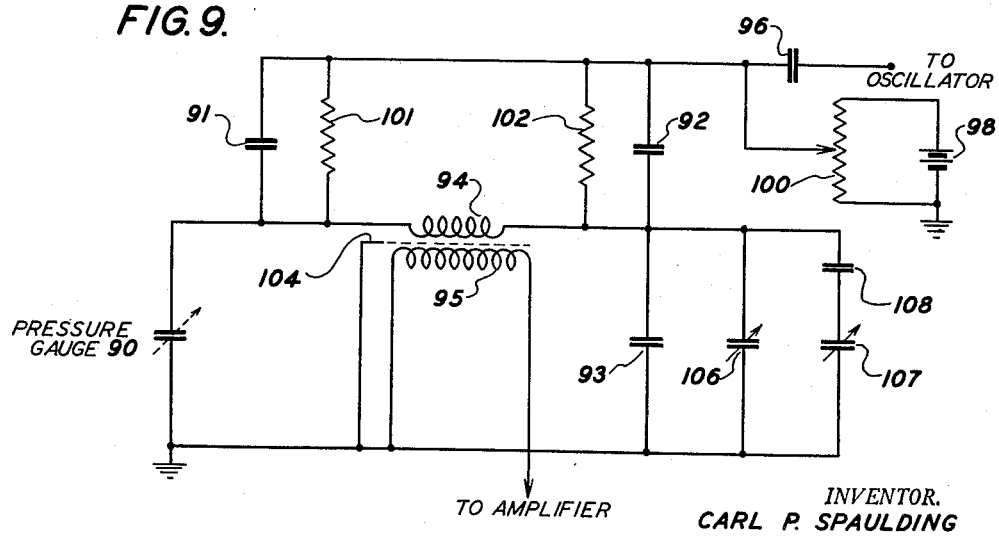
Fig. 9 is a simplified diagram showing a circuit whereby an electrostatic restoring force can be applied across the capacitor formed by the diaphragm and conductive member of either of the gauges of Figs. 1 or 7.

A form of electrical circuit for sensing and measuring variations in the capacitance of the gauge capacitor is shown in the diagram of Fig. 9. A circuit for use with a gauge of this type which finds use in measuring pressure differentials as low as 100 microns or less must be sensitive to capacitance changes in the order of magnitude of $10^{-2}$ micromicrofarads. The circuit shown in Fig. 9 is illustrated and described in detail in my co-pending application, Serial No. 143,619, filed February 11, 1950.

Referring to Fig. 9, the associated circuit comprises a capacitance bridge, the four arms of which constitute gauge capacitor 90, and capacitors 91, 92, 93, respectively. A transformer is connected through its primary winding 94 across the bridge output, the secondary winding 95 of the transformer being connected to an amplifier not shown. An oscillator (not shown) is connected through a capacitor 96 to feed a carrier current to the bridge. A source 98 of D. C. voltage is connected across a potentiometer 100, the output lead of which is connected to the bridge input in parallel with the oscillator on the bridge side of capacitor 96. Resistors 101, 102 are connected, respectively, in parallel across the second and third arms of the bridge. These resistors serve to furnish a path for D. C. current from source 98 to the gauge capacitor 90 to apply an electrostatic restoring force thereto. The resistors also function, even when no D. C. power is used, to ground stray charges on the gauge capacitor.

The transformer is provided with a shield 104 which is grounded and serves the double function of preventing capacitance coupling of balanced voltage into the secondary and of grounding stray capacities of the bridge circuit. As described in detail in my aforesaid application, I have found that it is necessary to achieve the desired sensitivity, to cause the capacitance bridge to work into an inductive load. By this arrangement impedances can be matched to obtain maximum power transfer and increase the signal-to-noise ratio. Hence, the desirability of the shield 104, which excludes all but inductive coupling.

Variable capacitors 106 and 107 are connected in parallel across bridge capacitor 93 and a capacitor 108 is connected in series with capacitor 107. This arrangement of one leg of the bridge allows the bridge to be balanced, capacitor 106 providing coarse adjustment and capacitor 107 providing fine adjustment.

In operation, the bridge is balanced by the above means with both sides of the gauge diaphragm at the reference pressure. When the bridge is unbalanced by deflection of the diaphragm as a result of a pressure differential between the two sides, an unbalance signal is developed across the primary winding 94 of the transformer. This signal is amplified and may be used in a number of ways to achieve the intelligence desired. Thus the amplified unbalance signal can be measured directly. Alternatively, the bridge can be balanced to extinguish the signal by adjustment of capacitors 106, 107. In this event, the required adjustment will constitute a measure of unbalance and hence, indirectly, of pressure. As a preferred method, a D. C. voltage is applied from source 98 to develop an electrostatic restoring force across the gauge capacitor. The setting of potentiometer 100 at the point of extinction of the unbalance signal is, in this procedure, an indirect measure of pressure. Conveniently, the amplified unbalance signal is applied through conventional servo means to automatically vary the potentiometer output.

Some of the possible modifications and improvements on the simple circuit shown in Fig. 9 are discussed in the referred to copending application.

Although the gauge of the invention has been described with particular emphasis on its use as a micro-manometer, it also finds application as an accelerometer, displacement gauge or the like, where the parameter to be measured may be used to displace the diaphragm in relation to the conductive surface on the adjoining dielectric disk.

I claim:

1. A gauge comprising two compartments separated by a conductive diaphragm which provides a fluid-tight seal between the two compartments, means for connecting the respective compartments to separate pressure systems so that the deflection of the diaphragm is determined by the difference in pressure between the separate pressure systems, a conductive member spaced from the diaphragm and presenting a surface to the deflectable portion of said diaphragm, said surface being concave with respect to the side of the diaphragm adjacent said surface, the diaphragm and conductive member forming a capacitor, and means coupled to the diaphragm and the conductive member for sensing changes in capacitance of said capacitor resulting from deflection of said diaphragm.

2. A gauge comprising two compartments separated by a conductive diaphragm which provides a fluid-tight seal between the two compartments, means for connecting the respective compartments to separate pressure systems so that the deflection of the diaphragm is determined by the difference in pressure between the separate pressure systems, a conductive member spaced from the diaphragm and presenting a surface to the deflectable portion of said diaphragm, said surface being concave with respect to the side of the diaphragm adjacent said surface, the diaphragm and conductive member forming a capacitor, means coupled to the diaphragm and the conductive member for sensing changes in capacitance of said capacitor resulting from deflection of said diaphragm, and means for applying an electrostatic field across said capacitor to maintain said diaphragm in a null position.

3. A gauge for measuring pressure in an enclosure comprising two compartments separated by a conductive diaphragm, means for connecting the first of said compartments with said enclosure, means for connecting the second compartment with an evacuating means whereby the pressure in the second compartment may be adjusted to a predetermined value, a conductive member spaced from the diaphragm and presenting a surface to the deflectable portion of said diaphragm, said surface being concave with respect to the side of the diaphragm adjacent said surface, the diaphragm and conductive member forming a capacitor, and means for sensing changes in capacitance of said capacitor resulting from deflection of said diaphragm.

4. A gauge for measuring pressure in an enclosure comprising two compartments separated by a conductive diaphragm, means for connecting the first of said compartments with said enclosure, means for connecting the second compartment with an evacuating means whereby the pressure in the second compartment may be adjusted to a predetermined value, a conductive member spaced from the diaphragm and presenting a surface to the deflectable portion of said diaphragm, said surface being concave with respect to the side of the diaphragm adjacent said surface, the diaphragm and conductive member forming a capacitor, means for sensing changes in capacitance of said capacitor resulting from deflection of said diaphragm, and means for applying an electrostatic field across said capacitor to maintain said diaphragm in a null position.

5. A gauge for measuring pressure in an enclosure comprising two compartments separated by a conductive diaphragm, means for connecting the first of said compartments with said enclosure, means for connecting the second compartment with an evacuating means whereby the pressure in the second compartment may be adjusted to a predetermined value within approximately 500 microns of the unknown pressure, a conductive member spaced from the diaphragm in the second compartment and presenting a surface to the deflectable portion of said diaphragm, said surface being concave with respect to the side of the diaphragm adjacent said surface, the diaphragm and conductive member forming a capacitor, means for sensing changes in capacitance of said capacitor resulting from deflection of said diaphragm, and means for applying an electrostatic field across said capacitor to maintain an electrostatic field across said capacitor to maintain said diaphragm in a null position.

6. A gauge for measuring pressure in an enclosure comprising two compartments separated by a conductive diaphragm, means for connecting the first of said compartments with said enclosure, means for connecting the second compartment to pressure-regulating means whereby the pressure in said compartment may be adjusted to a predetermined value, a conductive member having its central portion spaced from the deflectable portion of said diaphragm not more than 0.005 inch, said central portion being concave with respect to the side of the diaphragm adjacent thereto, the diaphragm and conductive member forming a capacitor, and means for sensing variations in the capacitance of said capacitor resulting from deflections of said diaphragm.

7. A gauge for measuring pressure in an enclosure comprising two compartments separated by a conductive diaphragm, means for connecting the first of said compartments with said enclosure, means for connecting the second compartment to pressure-regulating means whereby the pressure in said compartment may be adjusted to a predetermined value, a conductive member having its central portion spaced from the central portion of the diaphragm not more than 0.005 inch, the surface of the central portion of said member adjacent said diaphragm being concave with respect to the adjacent side of the diaphragm, the diaphragm and conductive member forming a capacitor, means for sensing variations in the capacitance of said capacitor resulting from deflections of said diaphragm, and means for applying an electrostatic field across said capacitor to maintain said diaphragm in a null position.

8. A gauge comprising two compartments separated by a conductive diaphragm which provides a fluid-tight seal between the two compartments, means for connecting the respective compartments to separate pressure systems so that the deflection of the diaphragm is determined by the difference in pressure between the separate pressure systems, a dielectric disk bearing against one side of the diaphragm, the disk having a cavity formed in the face thereof which is adjacent the diaphragm, a conductive metallic layer formed on the surface of the cavity, the conductive metallic layer being concave with respect to the diaphragm, the diaphragm and conductive layer forming a capacitor, and means coupled to the diaphragm and the metallic layer on the surface of the cavity for sensing variations in the capacitance of said capacitor resulting from deflections of said diaphragm.

9. A gauge comprising two compartments separated by a conductive diaphragm which provides a fluid-tight seal between the two compartments, means for connecting the respective compartments to separate pressure systems so that the deflection of the diaphragm is determined by the difference in pressure between the separate pressure systems, a dielectric disk bearing against one side of the diaphragm, the disk having a cavity formed in the face of the disk which is adjacent the diaphragm, a conductive metallic layer formed on the surface of the cavity, the conductive metallic layer being concave with respect to the diaphragm, the diaphragm and conductive layer forming a capacitor, means coupled to the diaphragm and the conductive metallic layer for sensing variations in the capacitance of said capacitor resulting from deflections of said diaphragm, and means for applying an electrostatic field across said capacitor to maintain said diaphragm in a null position.

10. A gauge for measuring pressure in an enclosure comprising two compartments separated by a conductive diaphragm, means for connecting the first of said compartments with said enclosure, means for connecting the second compartment to pressure-determining means whereby the pressure in said compartment may be adjusted to a predetermined value, a dielectric disk bearing against one side of the diaphragm, the disk having a cavity formed in the face of the disk which is adjacent the diaphragm, a conductive metallic layer formed on the surface of the cavity, the conductive metallic layer being concave with respect to the diaphragm, the diaphragm and conductive layer forming a capacitor, and means for sensing variations in the capacitance of said capacitor resulting from deflections of said diaphragm.

11. A gauge for measuring pressure in an enclosure comprising two compartments separated by a conductive diaphragm, means for connecting the first of said compartments with said enclosure, means for connecting the second compartment to pressure determining means whereby the pressure in said compartment may be adjusted to a predetermined value, a dielectric disk bearing against one side of the diaphragm, the disk having a cavity formed in the face of the disk which is adjacent the diaphragm and not exceeding about .005 inch in depth, a conductive metallic layer formed on the surface of the cavity, the diaphragm and conductive layer forming a capacitor, and means for sensing variations in the capacitance of said capacitor resulting from deflections of said diaphragm.

12. A gauge for measuring pressure in an enclosure comprising two compartments separated by a conductive diaphragm, means for connecting the first of said compartments with said enclosure, means for connecting the second compartment to pressure determining means whereby the pressure in said compartment may be adjusted to a predetermined value, a dielectric disk bearing against one side of the diaphragm, the disk having a concave cavity formed in the face of the disk which is adjacent the diaphragm, a conductive metallic layer formed on the surface of the cavity, the diaphragm and conductive layer forming a capacitor, and means for sensing variations in the capacitance of said capacitor resulting from deflections of said diaphragm.

13. A gauge for measuring pressure in an enclosure comprising two compartments separated by a conductive diaphragm, means for connecting the first of said compartments with said enclosure, means for connecting the second compartment to pressure-determining means whereby the pressure in said compartment may be adjusted to a predetermined value, a dielectric disk bearing against one side of the diaphragm, the disk having a concave cavity formed in the face of the disk which is adjacent the diaphragm and not exceeding about .005 inch in depth, a conductive metallic layer formed on the surface of the cavity, the diaphragm and conductive layer forming a capacitor, and means for sensing variations in the capacitance of said capacitor resulting from deflections of said diaphragm.

14. A gauge for measuring pressure in an enclosure comprising two compartments separated by a conductive diaphragm, means for connecting the first of said compartments with said enclosure, means for connecting the second compartment to pressure-regulating means whereby the pressure in said compartment may be adjusted to a predetermined value, a dielectric disk mounted in the second compartment and bearing against the diaphragm, the disk having a concave cavity not exceeding about .005 inch in depth formed in the face of the disk adjoining the diaphragm, the disk also having a central bore therein opening into the cavity, a conductive metallic layer formed on the surface of the cavity and walls of the bore, the diaphragm and conductive layer forming a capacitor, means for making electrical contact with the conductive layer within the bore, and means for sensing variations in the capacitance of said capacitor resulting from deflections of said diaphragm.

15. Apparatus according to claim 14 wherein the dielectric disk is a glass disk.

16. A gauge for measuring pressure in an enclosure comprising two compartments separated by a conductive diaphragm, means for connecting the first of said compartments with said enclosure, means for connecting the second compartment to pressure-regulating means whereby the pressure in said compartment may be adjusted to a predetermined value, a dielectric disk mounted in the second compartment and bearing against the diaphragm, the disk having a concave cavity not exceeding about .005 inch in depth formed in the face of the disk adjoining the diaphragm, the disk also having a central bore therein opening into the cavity, a conductive metallic layer formed on the surface of the cavity and walls of the bore, the diaphragm and conductive layer forming a capacitor, means for making electrical contact with the conductive layer within the bore, means for sensing variations in the capacitance of said capacitor resulting from deflections of said diaphragm, and means for applying an electrostatic field across said capacitor to maintain said diaphragm in a null position.

17. A pressure gauge comprising a flexible diaphragm composed of a conductive material, a rigid conductive member spaced from and presenting a surface to the deflectable portion of said diaphragm, said surface being concave with respect to the side of the diaphragm adjacent said surface, separate means communicating with the respective sides of the diaphragm for creating a pressure differential between the sides of the diaphragm and causing deflection thereof, and means coupled to the diaphragm and the conductive member for connecting the diaphragm and the conductive member to apparatus for sensing variations in the capacitance between the diaphragm and the conductive member.

CARL P. SPAULDING.

References Cited in the file of this patent

UNITED STATES PATENTS

| Number | Name | Date |
|---|---|---|
| 1,939,067 | Legg | Dec. 12, 1933 |
| 2,500,643 | Munson et al. | Mar. 14, 1950 |
| 2,567,253 | Strange et al. | Sept. 11, 1951 |

FOREIGN PATENTS

| Number | Country | Date |
|---|---|---|
| 574,873 | Germany | Apr. 21, 1933 |
| 895,938 | France | Feb. 7, 1945 |

OTHER REFERENCES

Lafay (article), Competes Rendus, Dec. 13, 1909, vol. 149, pages 1115, 1116 and 1117.

Willey (article), Journal of Scientific Instruments, Nov. 1946, vol. 23, pages 264, 265 and 266.

Sell (article), Zeitschrift fuer Technische Physik, January 1937, pages 3–10.